(12) United States Patent
Buttitta et al.

(10) Patent No.: US 6,289,095 B1
(45) Date of Patent: Sep. 11, 2001

(54) NPA SPLIT MANAGEMENT IN INTELLIGENT NETWORK ENVIRONMENT

(75) Inventors: Anthony Buttitta, Schaumburg, IL (US); Augustine Sylvester Samba, Reynoldsburg, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/162,911

(22) Filed: Sep. 29, 1998

(51) Int. Cl.[7] .............................. H04M 3/42; H04M 7/00
(52) U.S. Cl. ......................... 379/220; 379/207; 379/230
(58) Field of Search ................................... 379/207, 201, 379/230, 219, 136, 220, 221, 211, 229

(56) References Cited

U.S. PATENT DOCUMENTS

| | | | |
|---|---|---|---|
| 5,623,541 | 4/1997 | Boyle et al. | 379/136 |
| 5,757,900 | 5/1998 | Nagel et al. | 379/207 |
| 5,933,489 | 8/1999 | Sensabaugh et al. | 379/219 |
| 5,978,462 | 11/1999 | Fuhrmann | 379/201 |
| 6,122,362 | 9/2000 | Smith et al. | 379/230 |

FOREIGN PATENT DOCUMENTS

| | | |
|---|---|---|
| 0629092 | 2/1994 | (EP) . |
| WO9320641 | 10/1993 | (WO) . |
| WO9523486 | 8/1995 | (WO) . |

Primary Examiner—Harry S. Hong
(74) Attorney, Agent, or Firm—Neil R. Ormos

(57) ABSTRACT

An NPA split management system and associated methods for receiving from a user descriptive instructions regarding an upcoming NPA split, and responsively updating components of the Intelligent Network to reflect corresponding changes in the NPA codes assigned to lines, subscribers, services, etc. A user interface operating in conjunction with a Service Management System allows the user to declare an NPA split and define its characteristics, including the old NPA code, the new NPA code, the central office codes to be "transferred" to the new NPA, and the dates of beginning and end of the permissive dialing period (PDP). The SMS contains indicia corresponding to SMS-managed databases, or tables, records, or fields thereof, which definitively specify whether the data contained therein is affected by an NPA split. The SMS determines which items require updating to the new NPA code, and on which components the affected databases or services reside. The SMS transmits to each affected Intelligent Network component instructions to update the affected databases (or other items) by replacing the old NPA code with the new NPA code. The Intelligent Network component executes the update instruction and installs a translation table entry. When transactions arrive during the PDP, the Intelligent Network component translates mentions of the old NPA to the new NPA before providing the requested service, as the updated database no longer has references to the old NPA.

23 Claims, 8 Drawing Sheets

700

800

NPA SPLIT MANAGEMENT IN INTELLIGENT NETWORK ENVIRONMENT

FIELD OF THE INVENTION

This application relates to telecommunications systems, and more particularly to systems for maintaining information regarding telecommunications service subscribers and particular services available to such subscribers. Still more particularly, the application relates to methods and apparatus for the orderly updating of databases containing information relating to subscribers or to telecommunications services when a large number of records must be similarly updated, such as when an area-code or NPA "split" occurs.

BACKGROUND OF THE INVENTION

In most of the United States, Canada, and several Caribbean nations, telephone directory numbers are generally constructed according to the "North American Numbering Plan" and consist of a three-digit "Numbering Plan Area" code (often referred to as "NPA" or simply "area code"), a three-digit central office code, and a four-digit subscriber line number. The latter seven digits comprise what is generally considered to be a "local telephone number", and with some exceptions, this local telephone number is what a subscriber located is within a particular area code must dial in order to reach another subscriber within the same area code.

NPA codes were originally assigned in 1947 to states, metropolitan areas, or other geographical regions. The boundaries of NPA regions were typically aligned with existing political or natural boundaries. Over time, a small number of NPA codes have been assigned to particular services without regard to geographic significance. Within an NPA, central office codes are unique. As a result of restrictions on digits in certain positions, and several codes reserved for special services, there are 792 central office codes potentially available for use in each NPA, and therefore there are 7,920,000 unique telephone directory numbers theoretically available for use in each NPA.

In recent years, a dramatic increase in the subscription to and use of telecommunications services has created an explosion in demand for telephone directory numbers. New paging and mobile telephone services are relatively inexpensive compared to historical rates and have been widely adopted by users. Improved modems, printer technologies, and telecommunications networks have fostered significant increases in the use of facsimile machines. The unprecedented growth of the Internet has created demand for additional telephone lines, or equivalent capacity, from Internet Service Providers and from Internet users. All of these services require unique telephone directory numbers. Moreover, in the United States, recent changes to telecommunications laws have allowed competitive local exchange carriers ("CLECs") to request directory numbers for assignment to their subscribers. Directory numbers are often assigned to a CLEC in blocks of 10,000 numbers, even if the carrier's actual need for directory numbers is a tiny fraction of the block.

As a result of these factors, the available telephone numbers within many of the originally assigned NPA regions have been exhausted. Telecommunications service providers and others have been forced to "split" or subdivide an NPA, or to provide some other type of relief, in order to maintain the availability of telephone numbers for new subscribers, new services, and new carriers. Even after initial relief, demand for additional telephone numbers continues, and therefore further splits or other relief are often soon required. For example, the Chicago, Illinois metropolitan area, which had a single area code as late as 1989, has five area codes as of the filing of this application, and plans are underway to add a sixth. The State of Florida, which had three area codes as late as 1988, has eleven area codes as of the filing of this application.

When an NPA split occurs, typically some portion of the geographical territory in one or more existing NPAs is defined to be in a new NPA, an available unused NPA code is assigned to that territory, and whatever territory was not selected for the new NPA retains the code or codes of the existing NPA or NPAs. Typically, but not necessarily, a single existing NPA is split into two NPAs, and the territory of the new NPA is selected such that about half of the central office codes in the existing NPA geographical region are located within the boundaries of the new NPA. Multi-way splits and NPA boundary realignments are also possible. Certain other types of relief are available, such as an NPA overlay, in which one or more area codes are added to overlay the territory of one or more existing NPAs (or a subset thereof).

One characteristic of any plan for relieving telephone directory number exhaustion involving an NPA split or other NPA boundary realignment (which events will hereafter be collectively referred to as an "NPA split") is that a substantial fraction of the subscribers (and therefore a sizable absolute number thereof) originally located within the existing NPA will, as a result of the relief, be located in a different NPA and thus will have a different area code. (NPA overlays usually do not share this characteristic because the overlay area code usually is assigned only to "new" subscriptions, and therefore the addition of the overlay area code does not directly require the area codes of existing subscriptions within the overlay area to change).

In order to assure an orderly transition to the new area code, NPA splits are typically executed in several phases to allow affected subscribers, and those with whom they communicate, to update their records of telephone numbers, to perform any required modifications to customer-owned networks, and to otherwise adapt to the new area code. In a first phase, the new NPA is announced to the public, and a permissive dialing period (PDP) beginning some months in the future, and ending some additional months thereafter, is declared. Before the PDP begins, telecommunications carriers make necessary modifications to their networks to accommodate the new area code.

In a second phase—during the PDP—calls to subscribers in the new NPA may be placed using either the old area code or the new area code. For example, when the 312 area code was split in 1989, a new NPA, 708 was designated, which was assigned to a portion of the territory originally in the 312 area code. During the PDP, calls to that territory could be dialed using either area code 312 or 708.

In a third phase—after the PDP ends—the NPA split is complete. Central office codes which previously were in use in the existing NPA, but were allocated to the new NPA, are now effectively unused in the existing NPA, and thus telephone directory numbers using those central office codes are now available for assignment in the existing NPA. Similarly, central office codes which previously were in use in the existing NPA, and were not allocated to the new NPA, are unused in the new NPA, and are now available for assignment. Such assignment would not be possible during the PDP, because calls using either of the old or new area codes would terminate at the same number. Moreover, once the PDP ends, calls to the new NPA must be placed using the new area code. Calls which are attempted using the old area code to a telephone number which has been "moved" to the new NPA are routed to the old NPA, and typically will reference a telephone number which has not yet been assigned in the old NPA.

A change to the area code of a subscriber requires corresponding changes to records of the telecommunications service provider regarding that subscriber and the subscribed services. Changing such records in the context of an NPA split poses significant technical problems for several reasons: records regarding a large number of subscriptions (possibly in excess of four million) must be updated in a coordinated fashion; for each subscription, many records relating to various functions and services, and residing in different locations, may need to be updated, also in a coordinated fashion; and availability requirements in telecommunications networks are extremely rigorous, so that services for the affected subscribers must remain substantially continuously available before, during, and after the NPA split, including during periods within which the aforementioned record updates are performed.

Among the records which must be updated in the context of an NPA split are various records used to provide certain advanced telecommunications services through what is commonly referred to as the "Intelligent Network". As is known, the Intelligent Network has been implemented by supplementing the switching, signaling, and transmission elements of traditional telecommunications networks with a plurality of interconnected and cooperative adjunct elements which provide database, information processing, and signal processing services to a telecommunications network.

An example of a service provided through the Intelligent Network is the popular "toll-free" inbound telephone service, wherein calls to special area codes (e.g. 800, 888, 877) are completed without charge to the calling party (but are paid for by the called party). As these services are currently implemented, the telephone numbers in these special area codes are not assigned to "real" telephone lines. Instead, each of these special telephone numbers are associated with one or more conventional telephone directory numbers which are to receive calls placed to the special number. When a call is placed to one of the special numbers, a database inquiry is performed using components of the Intelligent Network to determine an associated telephone directory number, and the call is directed to that number.

Another service provided through the Intelligent Network is the Caller-Id with Name service. When a call is placed to a subscriber of that service, a database inquiry is performed using components of the Intelligent Network to retrieve the caller's name, employing the supplied calling line identification as a key.

Both of the aforementioned services contemplate the presence of one or more databases having records containing telephone directory numbers which would be affected by an NPA split. The above-described services are merely two examples of many which may be provided through the Intelligent Network, and a large fraction of such services employ directory numbers which would be affected by an NPA split. Moreover, as known in the art, the components of the Intelligent Network, including the databases contemplated by the exemplary services, and others, may be widely distributed throughout the network of a telecommunications provider, and such components may also be replicated to achieve fault tolerance or desired levels of performance. Thus, in the environment of the Intelligent Network, a change affecting only a single telephone number may affect a plurality of different services and could require updates to a plurality of fields, records, or tables, in a plurality of databases, in a plurality of locations. Accordingly, when an NPA split occurs, all of these databases must be properly updated in a coordinated fashion without disrupting the services provided by the Intelligent Network.

In order to facilitate the task of creating and maintaining the various databases used in the Intelligent Network, in response to ordinary, day-to-day orders for service received from customers and to other required changes, telecommunications systems suppliers have developed "service management systems" (SMSs). An example of an SMS is the Lucent Technologies Service Management System, which is a product of the assignee of the present application. SMSs are typically implemented using general purpose computer systems (or networks thereof) and are typically connected via a suitable network to the Intelligent Network components for which they are responsible. The SMSs are responsible for receiving service order and other transactions from telecommunications service provider personnel, responsively maintaining a "golden" or record copy of each database, and causing any changes made to the golden copy of such databases to be propagated to Intelligent Network components which use such databases.

Although SMSs have proven to be useful systems for, inter alia, updating databases in the Intelligent Network in response to day-to-day transactions and events, each of these transactions typically involves a small number of records. SMSs ordinarily do not perform large-scale, coordinated updates, involving extremely large numbers of records, as would be required when an NPA split occurs. Instead, telecommunications service providers have relied on several labor-and resource-intensive processes to update the Intelligent Network databases.

In particular, prior to the beginning of the PDP, each Intelligent Network component, and each associated database, which may be affected by the NPA split must be manually identified by a person with subject-matter expertise in the content and format of the databases. In each identified database, each record containing data which would be affected by the NPA split must be identified, a second copy of each such record must be prepared, the NPA code fields in the new records must be updated with the new NPA code, and the new records must be inserted into the database. This allows calls to be placed using either of the old or new area codes. Although the processes of creating and updating the duplicate records may be automated, the task of establishing such automated processes requires further subject-matter expertise regarding the databases. Moreover, the creation and use of duplicate records is expensive in terms of processing and storage resources, both during the creation process and during production use.

Prior to the end of the PDP, each of the original records affected by the split, and which contain a reference to the old NPA (and for which duplicates were previously prepared and modified to refer to the new NPA), must be deleted from the database. This additional work thus incurs further processing and storage expense.

Accordingly, there exists a need for an improved Service Management System and associated Intelligent Network elements which cooperate to update in coordination large numbers of Intelligent Network database records, tables, or fields, and to implement Intelligent Network services based on the updated information, as required to effect NPA splits and other similar large-scale renumbering events. Although the background of the invention herein refers to certain problems experienced by telecommunications providers in areas subject to the North American Numbering Plan (NANP), it is believed that such problems are not unique to the NANP areas, and similar problems may be experienced by telecommunications providers worldwide now or in the future.

OBJECTS AND SUMMARY OF THE INVENTION

It is therefore an object of the present invention to provide apparatus and methods which overcome the aforementioned disadvantages of prior art service management systems and Intelligent Network components.

This object and other advantages are achieved by a preferred embodiment constructed according to the present invention, in which an NPA split management system and methods for use in conjunction therewith are provided for receiving from a user descriptive instructions regarding an upcoming NPA split, responsively identifying and updating affected databases and records with the new area code, and responsively modifying the behavior of Intelligent Network component call processing parts to accommodate calls placed using both the "old" and "new" area codes during a permissive dialing period (PDP).

As used hereinafter, the term "NPA split" is intended, where applicable, to refer collectively to traditional NPA splits, NPA boundary realignments, other types of numbering plan relief in which area codes of existing telephone directory numbers are changed, and other mass-renumbering events in which a large number of records are affected and telephone directory numbers, NPA codes, or similar information in the records must be modified in a like manner.

The NPA Split system provides a user interface component, operable in conjunction with a Service Management System, which allows the user to declare an NPA split and define its characteristics, including the old NPA code, the new NPA code, the central office codes to be "transferred" to the new NPA, the dates of beginning and end of the permissive dialing period, the desired operation, and optionally, other parameters. The operation may be one of: performing the NPA conversion, canceling a previously-scheduled conversion, or rolling an executed conversion back to the previous state. Typically, the "user" is a member of the administrative personnel of a telecommunications service provider.

In a preferred embodiment of the invention, the Service Management System (SMS) may include all of the functionality of existing SMSs. In addition, the SMS is modified to include indicia corresponding to SMS-managed databases, or tables, records, or fields thereof, which definitively specify whether the data contained in such databases, tables, records, or fields, is the type of data which could be affected by an NPA split.

In response to the declaration of the NPA split, the SMS analyzes the information provided by the user (e.g.: the old NPA code, the new NPA code, the central office codes to be "transferred" to the new NPA, and the dates of beginning and end of the permissive dialing period) and certain information already present at the SMS (e.g.: the topology of the Intelligent Network components under SMS control; the Service Package Applications and other services present on such components; and the database schema associated with each component, Service Package Application, and other services, including the NPA-split-sensitive indicia for each) to determine which databases and fields thereof require updating to the new NPA, and on which components the databases or Service Package Applications reside. A Service Package Application is a combination of high-level service logic, the software primitives that implement the service logic, and the data to which the service logic refers.

Based on the information determined above, the SMS transmits to each affected Intelligent Network component instructions to update the affected databases by replacing instances of the old NPA code with instances of the new NPA code. The Intelligent Network component executes the update instruction and when the update is complete, installs a translation entry into the translation table (as discussed below in greater detail), and reports the completion to the SMS. In response to receiving the completion report from the Intelligent Network component, the SMS updates its own "golden" copies of the affected databases or tables.

It is desirable to minimize the time required to process each update instruction on the Intelligent Network components. Accordingly, the SMS preferably schedules update operations for periods of minimal telecommunications network activity, such as during early morning hours, which correspond to periods of minimal load on the Intelligent Network components. Moreover, because each database or table may contain a large number of records, the SMS preferably transmits, and the Intelligent Network components preferably execute, a separate update instruction for each area code-central office code pair (i.e., each NPA-NXX pair) affected by the split. Each such instruction thus would affect a maximum of 10,000 distinct telephone directory numbers.

The SMS may also schedule NPA split update operations to be performed on Intelligent Network elements (or service support systems) at a particular time. In conjunction with this facility, the SMS also comprises a component 460 which cancels a previously-scheduled conversion, and a component 456 which "rolls back" an executed conversion to the previous state. A user may invoke either of these facilities through the SMS user interface 130. The converter component 520 (see FIG. 5), which resides on the network element 510, and may be a part of a service package application, performs the cancellation and rollback functions in response to instructions from the SMS. Similar facilities are provided on the service support systems.

The SMS uses the information provided by the user defining the affected area codes and central office codes, and the beginning and end of the permissive dialing period to prepare translation table entries to be transmitted to Intelligent Network components. Once an Intelligent Network component database or table has been updated with the new NPA code for NPA-split-affected telephone numbers, the old NPA code no longer exists in that database or table (at least in records corresponding to affected numbers).

Accordingly, the NPA split system provides a translator package for use on each affected Intelligent Network component to intercept messages requesting services, before such messages reach the service package to which they are addressed. The translator package determines whether there is a pending NPA split affecting a directory number contained in the message, and whether the permissive dialing period for that NPA split is unexpired. If so, the translator translates references to the old area code into references specifying the new area code. Thus, during the permissive dialing period, the translator package allows calls and transactions specifying either of the old or new NPA codes to be handled successfully.

BRIEF DESCRIPTION OF THE DRAWINGS

These and other features of the invention will be best understood by reference to the following detailed description of a preferred embodiment of the invention, taken in conjunction with the accompanying drawings, in which.

DETAILED DESCRIPTION OF THE PREFERRED EMBODIMENTS

Figure 1:
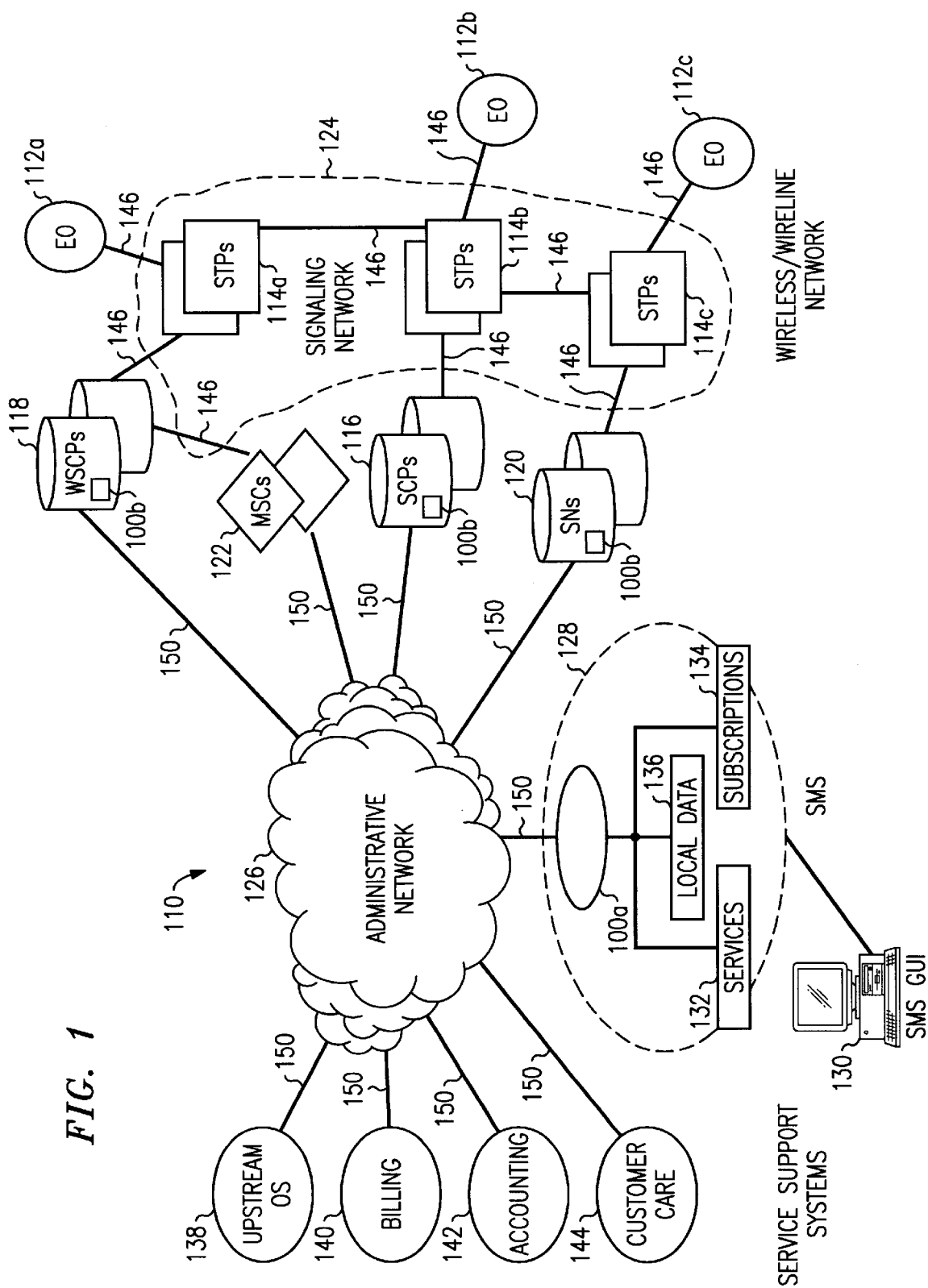
FIG. 1 is a diagram illustrating an Intelligent Network topology in which a preferred embodiment of an NPA split management system constructed according to the present invention may be used, in which drawing the Intelligent Network includes a Service Management System and Intelligent Network elements which provide cooperating components of the NPA split management system.

FIG. 1 is a diagram illustrating an Intelligent Network topology 110 in which a preferred embodiment of an NPA split management system 100a, 100b constructed according to the present invention may be used. As is known in the telecommunications art, the Intelligent Network provides, inter alia, advanced telecommunications services by augmenting the capabilities of certain conventional elements of telecommunications networks (such as telephone switching systems) through separate network-accessible components having data storage and retrieval, voice processing, service decision logic, or other capabilities. The Intelligent Network has been in use in North America for several years and is described in Bellcore documents GR-1298-CORE "AINGR: Switching Systems" and GR-1299-CORE "AINGR: Switch—Service Control Point (SCP)/Adjunct Interface." Accordingly, only those aspects of the Intelligent Network which are germane to the present invention will be described further herein.

As used hereinafter, the term "NPA split" is intended, where applicable, to refer collectively to traditional NPA splits, NPA boundary realignments, other types of numbering plan relief in which area codes of existing telephone directory numbers are changed, and other mass-renumbering events in which a large number of records are affected and telephone directory numbers, NPA codes, or similar information in the records must be modified in a like manner.

As best seen in FIG. 1, the Intelligent Network topology 110 comprises one or more end offices (EOs) 112a, 112b, 112c connected to one or more signaling transfer points (STPs) 114a, 114b, 114c. One or more service-providing components 116, 118, 120 of the Intelligent Network, referred to generically as Network Elements (NEs), are also connected to the STPs. NEs may provide a variety of distinct types of services and are often referred to using names which reflect their specialization.

NE 116 is a Service Control Point, which, inter alia, maintains a database of services and subscribers, and responds to queries from other Intelligent Network components, such as end offices, regarding such services and subscriptions to enable a service to be provided. For example, when a special "toll free" number, such as a number having area code 800, is dialed, an inquiry may be made by end office 112b to SCP 116 to obtain an actual telephone directory number to which to route the call.

NE 118 is a Wireless Service Control Point (WSCP), which performs services similar to those of SCP 116 for switching offices used in wireless applications, such as mobile switching center (MSC) 122.

NE 120 is a Service Node (SN), which provides voice processing services, such as advanced operator services, or automatic voice response services. SN 120 may also provide services similar to those provided by SCP 116.

End Offices 112a, 112b, 112c, STPs 114a, 114b, 114c, and NEs 116, 118, 120 are interconnected via links 146. Links 146 may be any appropriate link capable of transferring data between these interconnected components, but are preferably communications links compliant with an international standard for telecommunications network signaling, such as Common Channel Signaling System No. 7 (CCS7) as is known in the art. Accordingly, links 146 and STPs 114a, 114b, 114c may be seen as forming a signaling network 124, shown by an interrupted line. Although the links 146 of the signaling network 124 are shown as point-to-point links, any other suitable network topology could also be used, including rings and busses.

End offices 112a, 112b, 112c, MSCs 122, and service nodes 120 are also interconnected by a network of transmission facilities (not shown) which carry the actual user message traffic (e.g., a voice call).

SCP 116, WSCP 118, SN 120, and MSC 122 are also connected to an administrative network 126 via links 150. The administrative network 150 may be implemented using any suitable network technology, in any suitable topology, and is preferably a commercially available wide-area network employing known media and protocols for physical link, data link, transport, and network functions. For example, the administrative network 150 may be implemented using Internet Protocol over ATM, Ethernet, or other appropriate low-level media.

The administrative network 126 and the signaling network 124 are shown herein as separate networks, but they need not be. The present invention is described, by way of easily understood example, in the context of existing circuit-switched telecommunications networks designed primarily to provide voice telephony and related services. One of skill in the art will appreciate that the signaling networks now in common use with circuit-switched voice telecommunications networks could be modified to employ the technology of commercially available data networks. Further, it is expected that the technology of commercially available data networks will, in the future, be used to deploy voice telephone services. One of skill in the art will appreciate how to modify the invention to accommodate such changes in signaling, switching, and transmission technologies.

The administrative network 150 is preferably also connected via links 150 to the telecommunications service provider's management information systems, referred to generally as "service support systems," such as operations system 138, billing system 140, accounting system 142, and customer care system 144.

A service management system (SMS) 128 is connected to the administrative network 126 via link 150. The SMS 128 allows the disparate network elements of the Intelligent Network, and the disparate services provided by such network elements, to be centrally managed and updated, as necessary, by the telecommunications service provider. As best seen in FIG. 1, the SMS 128 contains tables or databases relating to services 132, subscribers and subscriptions 134, and local information 136, which correspond to certain services and/or data that are provided on the NEs. The SMS 128 preferably also has a suitable user interface 130 (including appropriate hardware and software) which may be operated by "users" (typically, telecommunications service provider administrative personnel), to enter changes for such tables or database. The changes may include new information, deletions, revisions, cancellations, and rollbacks. The SMS may be remote Among the capabilities of existing SMSs are: maintaining a "golden" or reference copy of each database, table, or service used in the NEs 116, 118, 120; accepting changes requests input by telecommunications service provider personnel or supplied by automated systems; and, when changes are requested to such databases or tables, reliably propagating those changes to each NE on which the affected table, database, or service relies. The SMS may provide similar services to the service support systems 138, 140, 142, and 144. Central management by the SMS 128 avoids the need for telecommunications service provider personnel to directly.modify tables, databases, or services, which may reside on a plurality of NEs. Moreover, the SMS 128 allows service or subscription modification transactions from the telecommunications service provider's management systems to be processed in a controlled and reliable manner, and without interrupting call processing on any managed Intelligent Network elements.

In a preferred embodiment of the present invention, the functions of the NPA split management system are distributed. A first NPA split management part 100a is located on the SMS 128. A second NPA split management part 100b is located on each NE containing service, subscriber, or subscription information which may be affected by an NPA split and cooperates with the first NPA split management part 100a.

First NPA split management part 100a receives from a user descriptive instructions regarding an upcoming NPA split, responsively identifies affected services, databases, tables, or records, further identifies NEs on which the affected items reside, transmits instructions to update the affected items on the affected NEs, prepares and transmits translation table entries to modify the call processing behavior of the NEs, and correspondingly maintains the "golden" copies of the affected items.

Second NPA split management part 100b on each NE receives update instructions and translation table entries from the SMS, responsively applies the updates to the affected items residing on the NE; responsively installs translation table entries into the NE translation table; and responsive to the contents of the translation table, during a permissive dialing period, translates inquiries or other service requests containing an old NPA code to a reference to the updated code prior to acting on the inquiry or service request. Although the description herein refers to the second NPA split management part 100b as resident on Intelligent Network elements, the second NPA split management part 100b could also reside on service support systems such as 138, 140, 142, 144, and all of the functions of the second NPA split management part 100b which are normally provided in network elements but which do not directly relate to call processing could also be provided on such service support systems.

Figure 3:
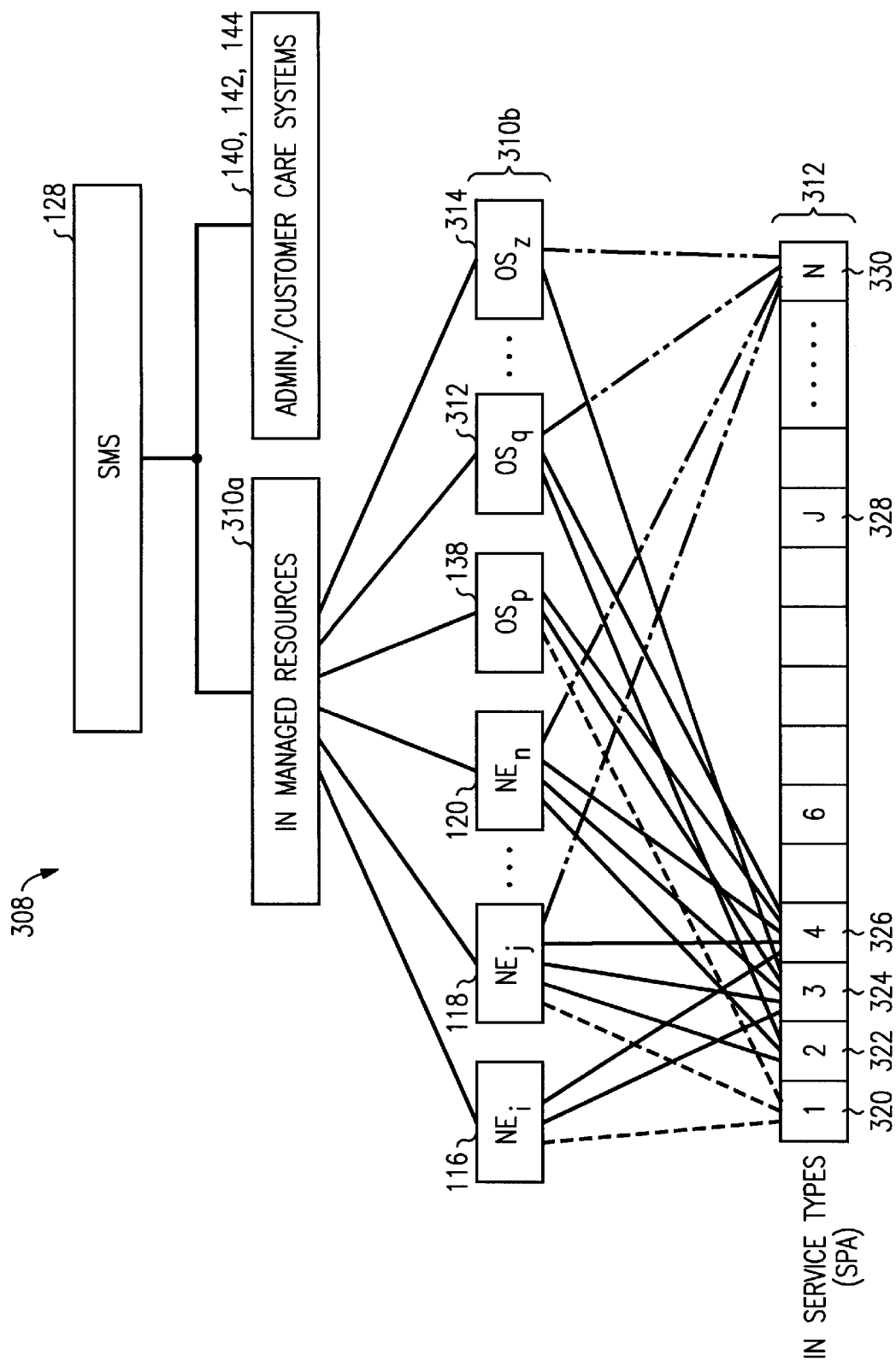
FIG. 3 is a block diagram illustrating how the Service Management System of FIG. 1 associates Intelligent Network service types or service package applications with the Intelligent Network elements through which those services are provided.

FIG. 3 is a block diagram illustrating how the Service Management System of 128 associates Intelligent Network service types or service package applications with the Intelligent Network elements through which those services are provided.

As best seen in FIGS. 1 and 3, the SMS 128 communicates with various telecommunications service provider administrative systems 140, 142, and 144, and with those resources of the Intelligent Network which are under SMS management (shown collectively in block 310a (FIG. 3), and individually in exploded form as group 310b). As best seen in FIG. 3, the resources 310a, 310b under SMS management may include several network elements 116, 118, 120, and several operations systems 138, 312, 314. The various IN managed resources 310b provide one or more Intelligent Network service types by way of Service Package Applications (SPA) 320, 322, 324, 326, 328, 330 (collectively designated 312), which may be implemented as appropriate software and associated databases, tables, or other data, residing on the resource.

The relationship between a service type (or SPA) 312 and a managed resource 310b on which that service resides is shown by solid lines. A particular service type may be provided by one or multiple managed resources, and a particular managed resource may provide one or multiple service types. For example, NE, 116 may provide a first, third, and fourth service type 320, 324, and 326, respectively, and the first service type 320 is available on $NE_i$. $NE_j$, and $OS_p$. The particular relationship of service types and network elements shown in FIG. 3 was selected for pedagogical convenience; the actual arrangement appropriate for a particular application would depend, inter alia, on the topology of the telecommunications service provider network, the need for various services, and the performance capabilities of the network elements.

Figure 2:
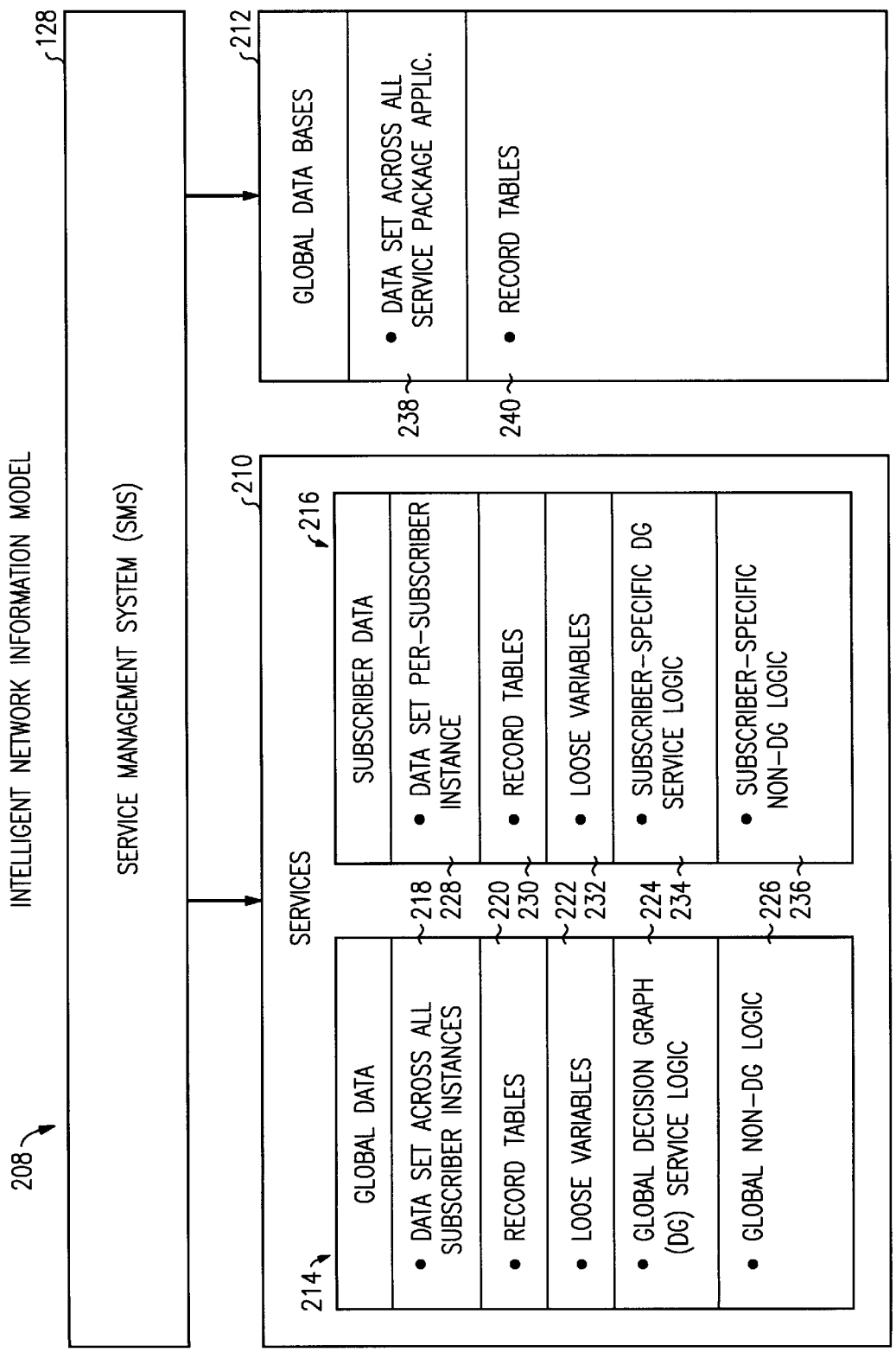
FIG. 2 is a simplified block diagram illustrating the Intelligent Network information model, as viewed by the Service Management System of FIG. 1.

FIG. 2 is a simplified block diagram illustrating the Intelligent Network information model, representing the information contained in a network element as managed by the Service Management System 128. Each network element contains a first type of data comprising one or more global databases 212. Included in the global databases 212 are certain record tables 240 which are available to all service package applications and other network element software.

Each network element also contains a second type of data comprising data 210 associated with a particular service. Although only one service-associated data component 210 is shown, if multiple service package applications are present, a corresponding service-associated data component will also be present. The service-associated data 210 may be further subdivided into global data 214, which has the same value across all subscriber instances, and subscriber data 216, which is set (and may vary) on a per-subscriber-instance basis. The global data 214 includes record tables 220, loose variables 222, global decision graph service logic 224, and global non-decision-graph logic 226. The subscriber data 216 includes record tables 230, loose variables 232, subscriber-specific decision-graph logic 234, and subscriber-specific non-decision-graph logic 236. Any of these components may contain data which must be converted or updated when an NPA split occurs.

Figure 4:
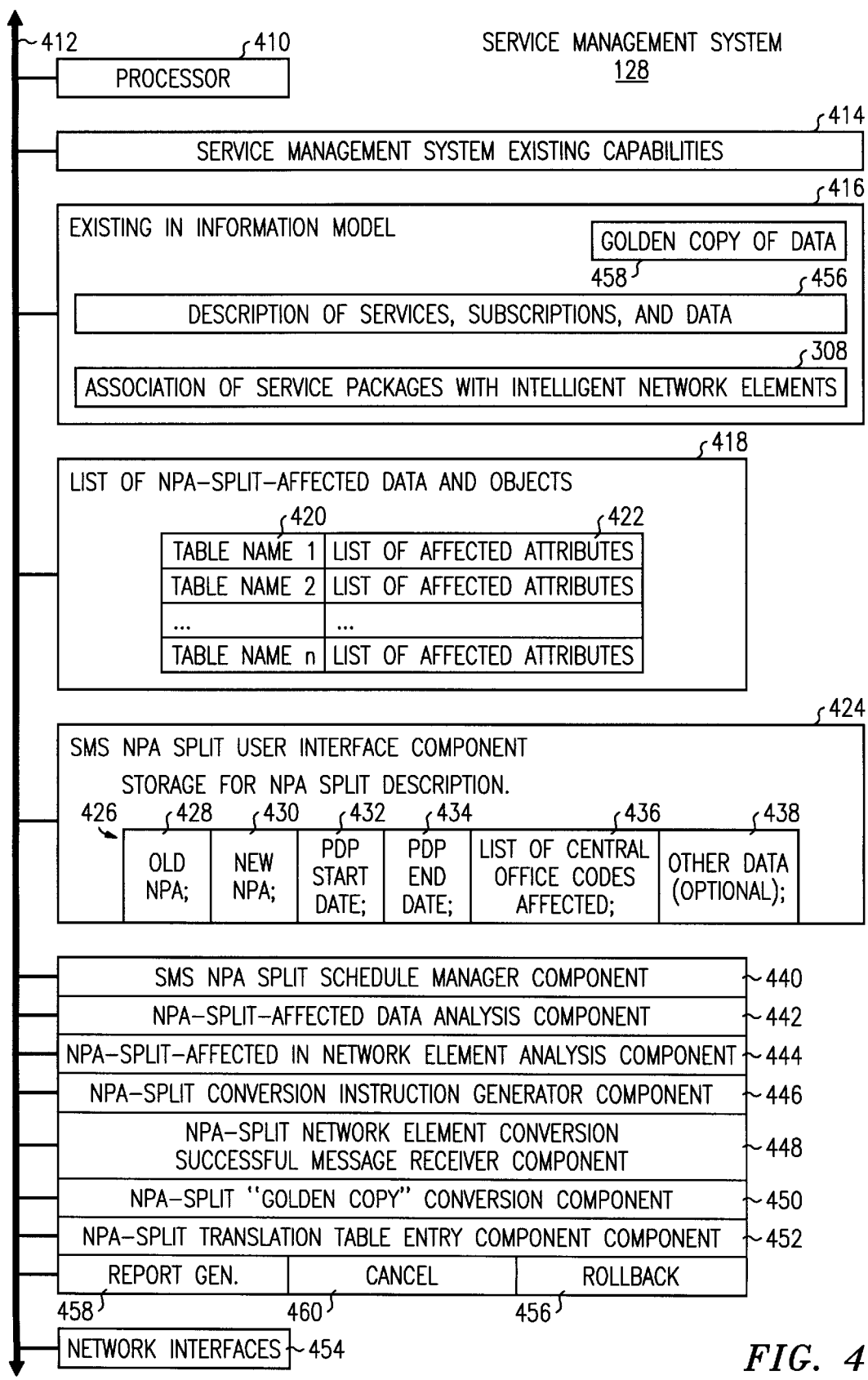
FIG. 4 is a block diagram depicting the architecture of the Service Management System of FIG. 1, showing in particular components which would provide a portion of the facilities of the NPA split management system of the present invention.

FIG. 4 is a block diagram depicting the architecture of the Service Management System 128, showing in particular the components relating to the NPA split management system of the present invention. As best seen in FIG. 4, SMS 128 includes a processor subsystem 410, at least one interface 454 to administrative network 126 (FIG. 1), a plurality of components 414–452 (described further in greater detail) for providing functions required to effect the NPA split management system, and a communications and control pathway 412 for interconnecting the processor 410, the network interface 454, and the components 414–452. The processor subsystem 410 of the SMS 128 may be implemented using any suitable general-purpose computer having appropriate processor, memory, and secondary storage resources, an interface for connection to administrative network 150, appropriate operating system and applications software, and a suitable user interface 130, including at least a keyboard and display. Model K460 and T600 computers which are commercially available from Hewlett-Packard Company, 3000 Hanover Street, Palo Alto, Calif. 94304–1185, running the HP-UX10 operating system, have been used to implement a SMS product commercially available from Lucent Technologies, Inc., the assignee of this application, under the designation "Lucent Technologies Service Management System". This product could be used as a platform to implement the SMS 128 described herein. Other computer systems could also be used, as could other special-purpose digital systems.

Preferably, the general purpose computer used to implement the processor subsystem 410 is used to provide network interface 454 and communications pathway 412. Components 414–452 are preferably implemented using suitable operating system and applications software running in the processor subsystem. Although the architecture of SMS 128 is described herein, by way of example, as preferably implemented using a general-purpose computer system, one of skill in the art will appreciate that the described components, or their equivalents, could also be implemented using a variety of other technologies, including special-purpose digital systems or other information processing apparatus.

As best seen in FIG. 4, in a preferred embodiment of the invention, the Service Management System (SMS) 128 provides all of the capabilities of existing SMSs. These capabilities are collectively represented in the figure by block 414.

The SMS 128 further comprises a model 418 of the information maintained in the Intelligent Network in connection with those resources (i.e., network elements) which are managed by the SMS. In particular, the SMS 128 maintains a "golden" or record copy 458 of the databases, tables, and the like, which reside on the network elements as shown by diagram 208 (FIG. 2). Concomitantly, the SMS 128 also maintains a record of the schema or other description 456 of the organization of the data on the network elements. The SMS also maintains a record 308 of the associations of service packages with Intelligent Network elements (see also FIG. 3).

In addition, the SMS further comprises indicia 418 corresponding to SMS-managed databases, or tables, records, or fields thereof, which definitively specify whether the data contained in such databases, tables, records, or fields, is the type of data which could be affected by an NPA split. Typically, such items would include telephone directory numbers, pseudo-directory numbers, billing numbers, routing addresses, or the area-code fragment of such numbers. The indicia 418 may be stored, for example, as a structured plurality of entries, in which each entry contains the name 420 of a database or table, and a list 422 of the attributes (i.e. fields, columns, records, or the like) in such table which are affected by an NPA split.

Although the indicia 418 are described here in a particular organization, any suitable data structure or format, including an array, table, file, list, or other collection of data could also be used. Moreover, the indicia 418 are shown for clarity as being stored independent of the contents of the SMS' Intelligent Network information model 416. However, the indicia could also be stored as part of the information model itself, and might, for example, be stored in the data definition (or other database description) as an attribute or flag associated with the corresponding tables, records, fields, or attributes.

The NPA-split-sensitive (NSS) indicia 418 may be populated by telecommunications service provider personnel having subject matter expertise regarding the fields of the database. Alternatively, the NPA-split-sensitive indicia 418 could also be populated by an automated process which analyzes the contents of each field of the database to determine whether the field appears to contain NSS data. Preferably, however, the NPA-split-sensitive indicia 418 is preferably populated by the developer of the Service Package Application with which each database is associated, or, in some cases, the manufacturer or supplier of the Intelligent Network components, who presumably possess the greatest subject-matter expertise with regard to the format and significance of the database fields. This alternative is preferred in that it calls for the determination of which fields are NSS to be performed only once, ensures that NSS fields will be marked prior to declaration of the NPA split, and avoids the need for the telecommunications service provider' own subject matter experts to perform this function.

The NPA Split system provides a user interface component 424, operable in conjunction with the Service Management System 128, which allows the user to declare an NPA split and define its characteristics. The SMS 128 provides storage 426 for the NPA split characteristics provided by the user, including such items as the old NPA code 428, the new NPA code 430, the central office codes 436 to be "transferred" to the new NPA, the dates of beginning 432 and end 434 of the permissive dialing period, and optionally, other parameters 438. Typically, the "user" is a member of the administrative personnel of a telecommunications service provider.

The SMS further comprises a component 442 which analyzes the NPA-split-sensitive indicia 418 to determine which databases, tables, fields, or the like to determine which such objects require updating to the new NPA.

The SMS also comprises a component 444 which analyzes the record 308 of the associations of service packages with Intelligent Network elements to determine which Intelligent Network elements contain databases, records, tables, identified by component 442 as requiring updating to the NPA.

The SMS also comprises an NPA split conversion instruction generator component 446. The instruction generator 446 analyzes the information 424 provided by the user defining the characteristics of the NPA split (including the old NPA code 428, the new NPA code 430, the central office codes 436 to be "transferred" to the new NPA, and the dates of beginning 432 and end 434 of the permissive dialing period), and the results from analyzers 442 and 444. For each NPA-split-affected Intelligent Network element, the instruction generator 446 generates a separate instruction corresponding to each NPA-split-affected area code-central office code pair (NPA-NXX pair) directing such Intelligent Network element to update identified NPA-split-affected databases, tables, or other structures by changing specified instances of the old NPA-NXX pair to the new NPA-NXX pair.

When an update instruction is transmitted, the instruction generator 446 also preferably suspends non-NPA-split-related modifications to any databases or tables mentioned in the update instruction, in order to prevent inconsistencies among the Network Element and SMS versions of such databases or tables. However, these non-NPA-split modifications are stored in the SMS until NPA split processing has completed. Once the Network Element reports that the update has been successfully completed, modifications to those databases and tables are again permitted, and the stored modifications are then applied.

The SMS 128 preferably further comprises a report generator 458 which enables a user to obtain a centralized or "global" view of the status of the NPA split process on each Intelligent Network element and the service support systems. The SMS preferably presents the global view to the user via the SMS user interface component 130. Where possible, the SMS user interface component 130 displays the global view via a single transaction screen. The transaction screen software allows the user to query and view information about individual SMS-managed components.

For reasons explained more fully below, during execution of an update instruction, an Intelligent Network element may be unable to process transactions relating to the records being updated. Accordingly, it is important that each update instruction be executed rapidly. In most NPA splits, few, if any, existing telephone numbers are assigned a new central office code. Nonetheless, a separate instruction is preferably generated for each NPA-NXX pair because each such instruction will affect a maximum of 10,000 distinct telephone directory numbers. Although a particular telephone directory number may appear in multiple tables and may occur multiple times in tables, isolating instructions to affect 10,000 distinct directory numbers places a practical upper constraint on the amount of time and other processing resources which are required to execute the update.

In addition to limiting the effect of individual update instructions to 10,000 unique telephone numbers, SMS 128 comprises a schedule manager component 440 which preferably schedules update operations during user-specified periods of minimal telecommunications network activity, such as during early morning hours. This advantageously reduces the probability of call failures for at least two reasons: the call or transaction arrival rate is extremely low during this period; and the load on the Intelligent Network elements is also low, improving the speed with which the component performs the update. Moreover, where multiple Intelligent Network components are available to perform the same functions, known techniques may be used to update individual ones of such components off-line, while others remain on-line, eliminating the possibility of call failure caused by the inconsistent states of the database and the translation table during the brief update interval.

The SMS also comprises a translation table entry generator 452 which uses the information provided by the user defining the affected area codes and central office codes, and the beginning and end of the permissive dialing period to prepare translation table entries to be transmitted to the affected Intelligent Network elements. A translation table entry is generated and transmitted to each affected Intelligent Network element for each affected NPA-NXX pair. On each affected Intelligent Network element, a translator package is provided. After the databases on the Intelligent Network component have been updated with the new area code, the translation table entry is installed in the translation table. Beginning when the NPA-split update has been applied, the translator package translates references specifying the old area code into references specifying the new area code. The translation is needed to provide permissive dialing because if it were not performed, transactions referencing the old NPA code, after the old NPA code has been replaced with the new NPA code in the database, would fail.

As best seen in FIG. 4, the SMS 128 also comprises a conversion-successful message receiver component 448 which is responsive to a message transmitted from a Network Element indicating that an update instruction received from the SMS has been successfully executed and conversion of instances of the specified old NPA-NXX pair into instances of the new NPA-NXX pair is complete.

The SMS 128 also has a "golden copy" conversion component 450 which is responsive to the message receiver component 448. When the conversion complete message is received, the "golden copy" conversion component 450 applies an update, which is identical to that specified in the update instruction for which success is being reported, to the SMS' "golden copy" of the corresponding databases or tables. This ensures that the SMS golden copy of a database or table remains consistent with corresponding databases or tables on the affected Network Elements. In addition, the message receiver component 448 enables non-NPA-split modifications to the databases affected by the completed command. Such modifications are suspended during updates by the instruction generator 446 in order to prevent inconsistencies among the SMS and Network Element versions of databases or tables.

Figure 5:
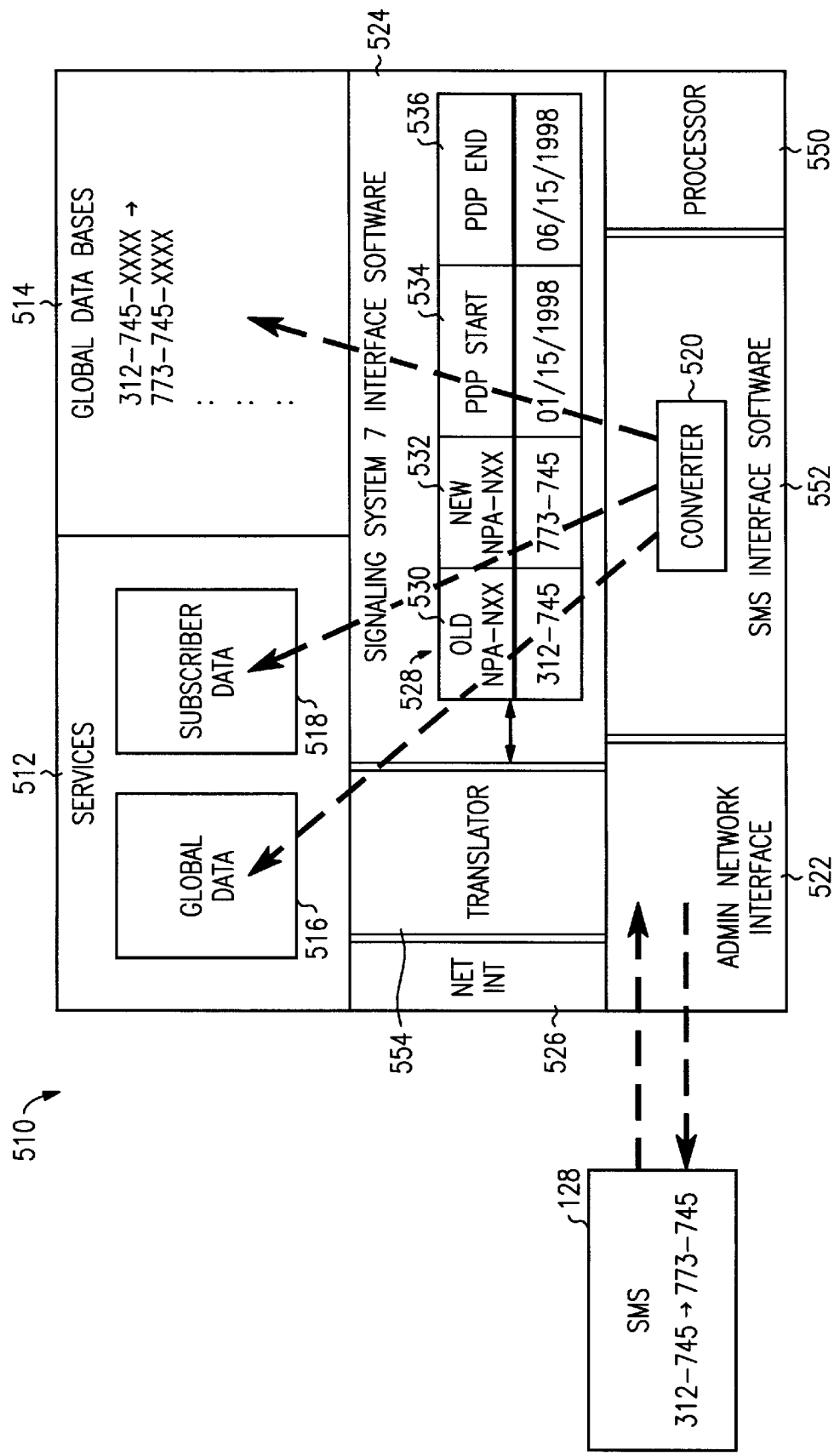
FIG. 5 is a block diagram depicting the architecture of the Intelligent Network elements of FIG. 1, showing in particular components which would provide another portion of the facilities of the NPA split management system of the present invention.

FIG. 5 is a block diagram depicting the architecture of a Network Element 510, showing in particular the components relating to the NPA split management system of the present invention. The Network Element 510 comprises a processor subsystem 550, an administrative network interface 522, an interface package 552 for handling messages exchanged with the SMS 128 via the administrative network, a signaling network interface 526, a message translator 554 (discussed further in greater detail), and logically partitioned data storage for global databases 514 and service-associated data 512. The global databases 514 contain information available to any service package application present on the network element. The service-associated data storage contains information which is specific to particular services present. The service associated data is further subdivided into global data 516, applicable to all subscriber instances, and subscriber data 518, which is associated with individual subscribers and may vary from subscriber to subscriber.

Network element 510, and in particular, the processor subsystem component 550 may be implemented using any suitable general-purpose computer having sufficient processing, storage, and other resources. A Network Element product w is commercially available from the assignee of this application under the designation Advantage Service Control Point. In that product, a computer commercially available from Mupac Corporation, 10 Mupac Dr., Brockton, Mass. 02401, having an Intel Pentium Pro microprocessor, and supporting up to 2 gigabytes of main memory and up to 12 mirrored pairs of 4 gigabyte disks, and supporting up to 12 Signaling System No. 7 links, has been employed, and such computer is believed to provide a suitable platform for implementing the Network Element processor subsystem described in this application.

Preferably, the general purpose computer used to implement the processor subsystem 510 is used to provide administrative network interface 522, signaling network interface 526, and internal communications pathways (not shown). Other components of the Network Element 510 are preferably implemented using suitable operating system and applications software running in the processor subsystem. Although the architecture of Network Element 510 is described herein, by way of example, as preferably implemented using a general-purpose computer system, one of skill in the art will appreciate that the described components, or their equivalents, could also be implemented using a variety of other technologies, including special-purpose digital systems or other information processing apparatus.

The SMS interface package 552 receives and initially processes messages transmitted by the SMS via the administrative network. A converter component 520 responds to update instruction messages from the SMS by applying the requested updates to the global databases 514, the service-associated global data 516, and the service-associated subscriber data 518 specified in the update instruction. The converter 520 changes specified instances of the old NPA-NXX pair to the new NPA-NXX pair. The converter 520 may access databases or tables directly, or, if a database management system is available, the converter 520 may submit update transaction requests through that system. When the update is complete, the converter 520 reports the successful completion of the instruction to the SMS 128 in a message transmitted over the administrative network. The converter 520 is preferably implemented on the Network Element 510 as a Service Package Application (SPA). This advantageously allows the converter 520 to be managed by the SMS in a manner similar to its management of other services resident on the Network Elements.

The converter 520 also installs a translation table entry supplied by the SMS into a translation table 528 maintained in the signaling interface package 524. The translation table preferably contains at least the old NPA code 530, the new NPA code 532, the PDP start date 534, and the PDP end date 536. A translator component 554 intercepts messages received on the signaling network interface 526 prior to delivery to the addressed SPA. When an NPA split is pending, for each incoming message requesting a service, the translator 554 determines whether a permissive dialing period is unexpired, and, if so, it searches the translation table 528 to determine whether an entry corresponding to the area code and central office code of the message is present and the PDP for that entry is unexpired. If these conditions are met, the translator 528 translates the old NPA to the new NPA in the message, and releases the message to the addressed service package. However, if any of these conditions are not met, the message is simply released to the addressed service package without translation.

Thus, once the permissive dialing period begins, all of the Intelligent Network component databases will have been updated such that for NPA-split-affected NPA-NXX pairs, only the new NPA code will be present. Queries or other transactions referencing the new NPA code will search (or perform the requested service) using the new NPA code and successfully match the corresponding table entry. Calls or transactions referencing the old NPA code will be translated to the new NPA code, and by virtue of the translation will match the corresponding table entry as though the new NPA code had been used.

During the interval between the beginning of the update for a particular NPA-NXX pair until the update is complete and the translation table entry is installed, some database or table entries may have been converted to the new NPA code, while others have not. Because the translation table entry for an NPA-NXX pair is not installed until the update has completed, calls or transactions using the old NPA code but which require a record that has already been converted to the new NPA code will fail. Accordingly, as mentioned above, it is highly preferable that the update interval be minimized, to minimize the opportunity for call or transaction failures. If update instructions are issued individually for each affected NPA-NXX pair, thereby limiting updates to a maximum of 10,000 affected distinct directory numbers, it is believed that currently available Intelligent Network components operating under a relatively light load, can perform the update for an NPA-NXX pair within approximately one second.

Figure 6:
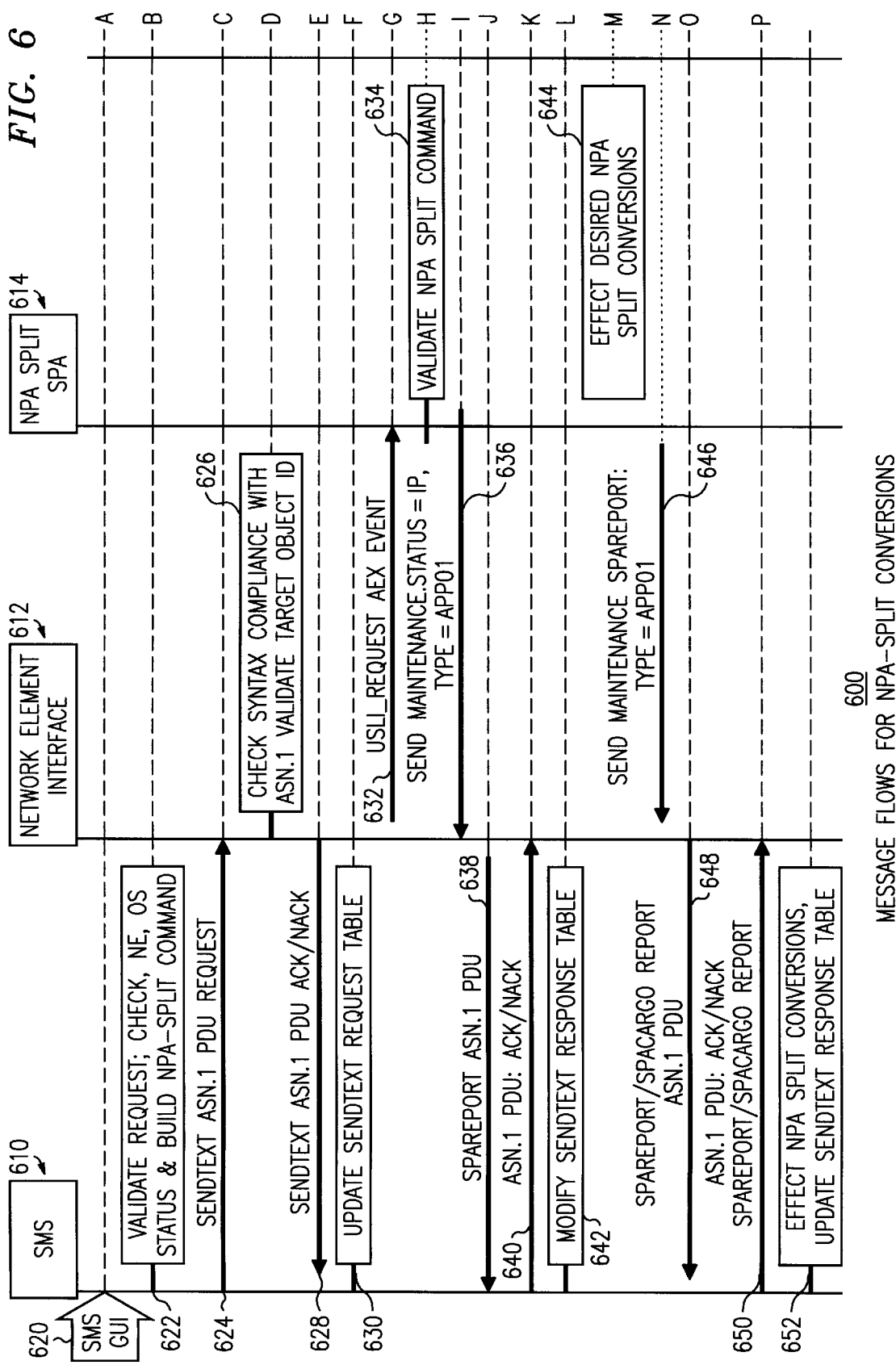
FIG. 6 is a message flow diagram showing an interaction between the Service Management System of FIGS. 1 and 4 with an Intelligent Network element of FIGS. 1 and 5 in performing an NPA split conversion.
Figure 7:
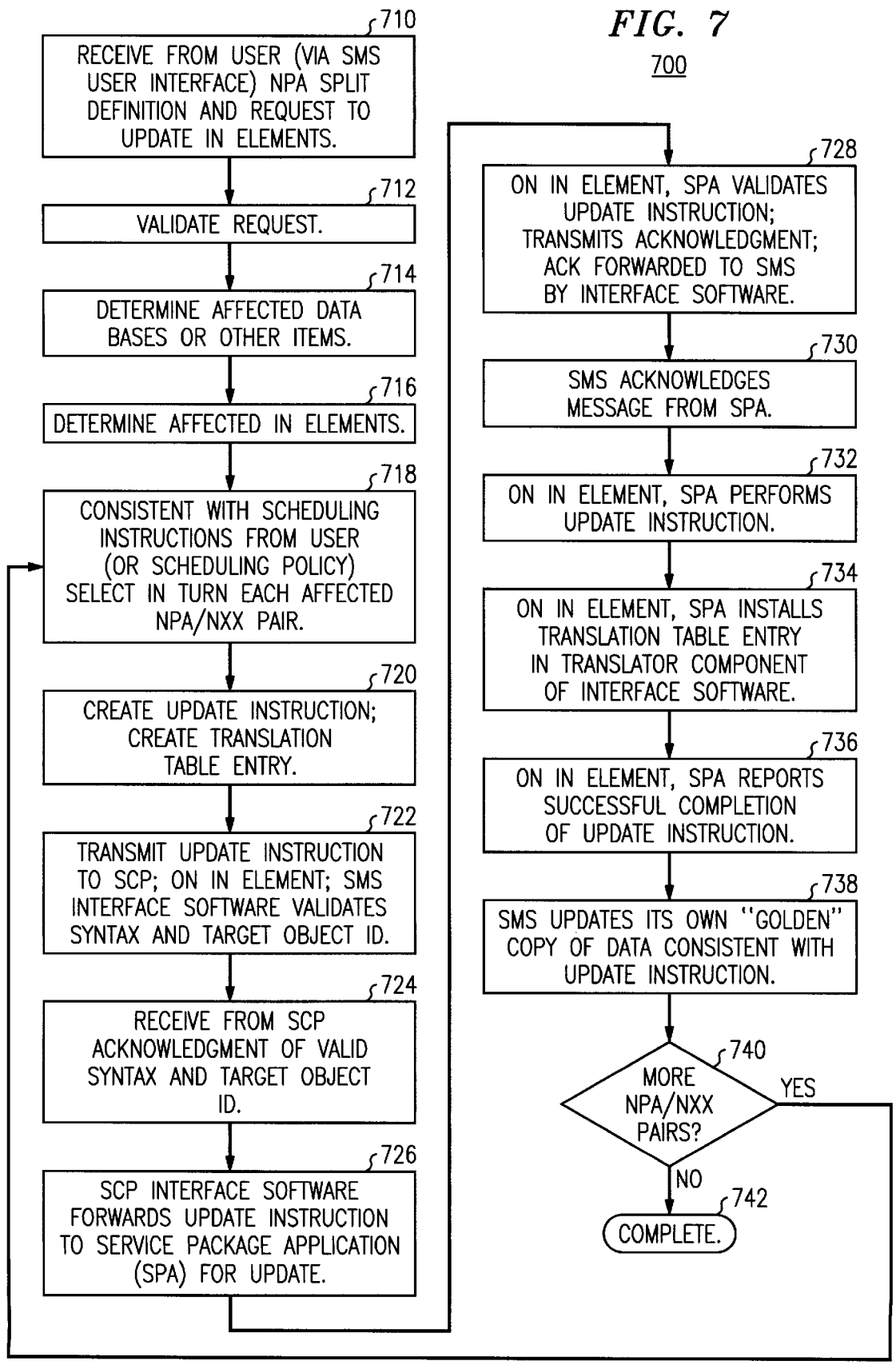
FIG. 7 is a flow diagram showing an exemplary method for use in conjunction with the NPA split management system of the present invention for performing the NPA split conversion.

FIG. 6 is a message flow diagram showing a message interaction 600 between the SMS of FIGS. 1 and 4 with an Intelligent Network element of FIGS. 1 and 5 in performing an NPA split conversion. FIG. 7 is a flow diagram showing an exemplary method 700 for use in conjunction with the NPA split management system of the present invention for performing the NPA split conversion. FIGS. 6 and 7 may be considered together. In describing the method 700 of FIG. 7, and the message flow 600 of FIG. 6, actions or events are taken by, or occur on, the SMS, unless otherwise specified. In FIG. 6, column 610 corresponds to events or messages originating in the SMS; column 612 corresponds to events or messages originating in the Intelligent Network element administrative network interface software; and column 614 corresponds to events or messages originating in the Intelligent Network NPA Split Service Package Application (SPA).

Method 700 begins in step 710 (corresponding to event 620 of FIG. 6), in which the SMS receives from a user, via the SMS user interface the definition of an NPA split, and a request to proceed with updating those Intelligent Network elements, and data and services associated therewith, which would be affected by the NPA split. The information received from the user preferably includes at least the information depicted in the NPA split description data structure 426: the old NPA code 428, the new NPA code 430, the central office codes 436 to be "transferred" to the new NPA, and the dates of beginning 432 and end 434 of the permissive dialing period. The user may provide other optional information.

In step 712, the SMS validated the user's request, to determine that the request is consistent with information the SMS maintains regarding the topology of the Intelligent Network elements under its management and regarding existing NPA and central office codes. Steps 712, 714, 716, 718, and 720 correspond to event 622. In step 714, the SMS analyzes the NPA-sensitive indicia for each database, table, or service to determine which such items must be updated. In step 716, the SMS determines which Intelligent Network elements have databases, tables, or services which must be updated.

In step 718, the SMS analyzes scheduling instructions provided by a user, or preexisting scheduling policies, to determine when to perform the NPA split updates. The SMS may wait until a time-of-day when, historically, load on Intelligent Network elements is light. The SMS also may meter update instructions at a controlled rate to minimize impact of the instructions on the performance of the Intelligent Network elements The SMS selects, in turn, each affected NPA/NXX pair. In step 720, the SMS builds the update instruction to be sent to one or more Intelligent Network elements. The Intelligent Network element may be a Service Control Point (SCP) as mentioned in FIGS. 6 and 7, but could also be any other element of the Intelligent Network. The SMS also creates a translation table entry for installation in the Intelligent Network elements after the updates from the old NPA/NXX pair to the new NPA/NXX pair has been completed. The Intelligent Network elements use the translation table entry during the PDP to translate requests or transactions referencing the old NPA/NXX pair into transactions referencing the new NPA pair, thereby providing permissive dialing of the old NPA/NXX code during the appropriate period. Also in step 720, the SMS may lock its own copies of the corresponding databases against updates to records which would be affected by the pending update instruction. This aids in maintaining consistency among the SMS and Intelligent Network element copies of the data.

In step 722 (corresponding to message 624 (FIG. 6)), the SMS transmits the update instruction to the Intelligent Network element. Also, on the Intelligent Network element, the SMS interface software validates the syntax of the message and the target object ID (i.e., the intended recipient of the message) (see event 626). The Intelligent Network element's SMS interface software transmits an acknowledgment message 628 to the SMS, which is received by the SMS in step 724. The SMS may responsively update a table it uses to record the state of its interaction with the Intelligent Network element (see event 630).

In step 726 (corresponding to message 632), the Intelligent Network element's SMS interface software forwards the update instruction to the NPA Split Service Package Application (SPA). In step 728, on the Intelligent Network element, the NPA Split SPA validates the update instruction (see event 634). The SPA transmits an message indicating the validity of the update instruction through the Intelligent Network element's SMS interface software (see message 636), which is then forwarded to the SMS (see message 638). In step 730, the SMS transmits an acknowledgment of the validity instruction to the Intelligent Network element (see message 640). The SMS may responsively update a table it uses to record the state of its interaction with the Intelligent Network element (see event 642).

In step 732 (corresponding to event 644), on the Intelligent Network element, the SPA performs the update instruction. In some cases, the database management software (or other object management facility) provides a facility to perform a global change to identified fields or attributes of specified records, and the SPA may exploit that service. However, in other cases, that service is not available, and the SPA may be obliged to perform the update operation directly. In that case, step 732 may include a number of substeps. For example, in a first substep, the SPA may perform a selection operation to identify the specific records (or other items) in which the old NPA/NXX appears in the identified fields or attributes. In a second substep, the SPA may retrieve the selected records. In a third substep, the SPA may select each retrieved record in turn, and replace the old NPA/NXX pair with the new NPA/NXX pair. In a fourth substep, the SPA may select each updated record in turn, and overwrite the corresponding old record in the database with the new (updated) record. Some databases may not provide an overwrite facility, and in that case, the SPA may insert the new (updated) record into the database, and delete the corresponding old record.

In step 734, on the Intelligent Network element, the SPA installs the translation table entry supplied by the SMS into the translation table 528 associated with the translator component 554 of the Intelligent Network element's signaling network interface software 524. In step 736, the SPA transmits to the SMS a report indicating completion of the update instruction (see messages 646, 648).

In step 738, the SMS responds to the update completion report by transmitting an acknowledgment of the completion report (see message 650). The SMS also updates its own "golden" copy of the data corresponding to the update instruction, thereby ensuring that the SMS and the Intelligent Network element contain consistent copies of the data (see event 652). The SMS may responsively update a table it uses to record the state of its interaction with the Intelligent Network element. If the SMS previously locked its own databases against updates to records which may be affected by the present update instruction, the SMS may unlock such databases or records at this point.

In step 740, the SMS determines whether there remain additional NPA/NXX pairs which require updates. If so, the method returns to step 718, in which the next NPA/NXX pair is selected, and the update process repeated. If no further NPA/NXX pairs require updates, the method is complete, as shown by step 742.

Figure 8:
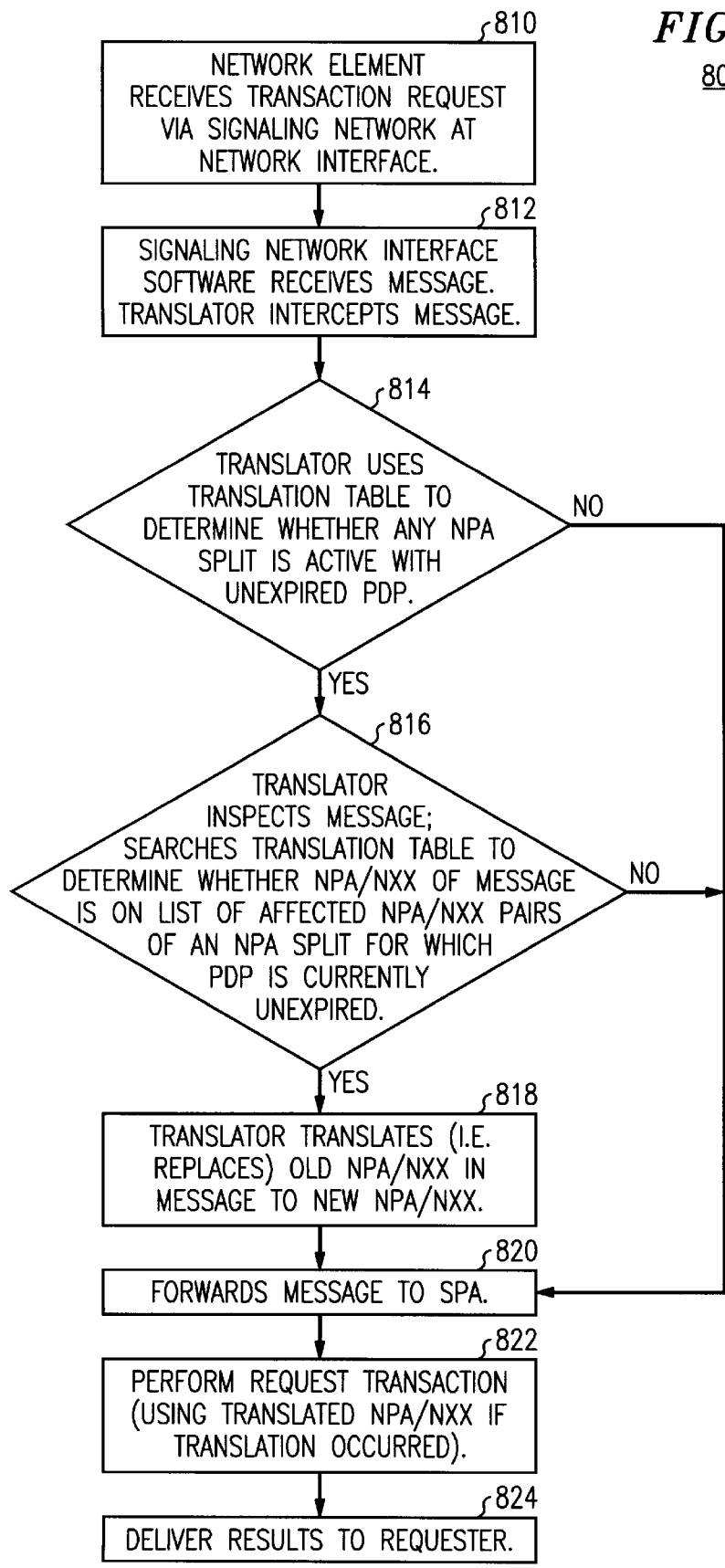
FIG. 8 is a flow diagram showing an exemplary method for use in conjunction with the NPA split management system of the present invention for processing service requests in the Intelligent Network elements according to a permissive dialing regime.

FIG. 8 is a flow diagram showing an exemplary method 800 for use in conjunction with the NPA split management system of the present invention for processing service requests in the Intelligent Network elements according to a permissive dialing regime.

The method begins in step 810, in which the Intelligent Network element receives a transaction request (which may be, for example, a database query), via the signaling network 124 (FIG. 1) at the signaling network interface 526 (FIG. 5). In step 812, the signaling network interface software 524 (FIG. 5) receives the message. The translator component 554 of the interface software intercepts the message. In step 814, the translator inspects the translation table 528 to determine whether there exist any NPA splits which are active and which have a PDP which remains unexpired. If there is no active NPA split with an unexpired PDP, a branch is taken to step 820, in which the signaling network interface software forwards the message to the addressed SPA without translation.

If there is an active NPA with an unexpired PDP, the method continues in step 816, in which the translator inspects the incoming transaction request message. In particular, depending on the transaction or query requested, the translator may inspect the dialed number, the calling party's number, and/or the caller's billing number. The translator then searches the translation table to determine whether the NPA/NXX contained in the particular inspected number of the transaction request message is on a list of NPA/NXX pairs which are involved in an NPA split for which the permissive dialing period is unexpired. As discussed above, the translation table may, for example, contain an entry corresponding to each NPA/NXX pair involved in an NPA split, and the entry may identify, inter alia, the start and end dates of the PDP. However, other arrangements of the translation table could also be used. Optionally, in step 816, if the translator determines that the inspected number is directed to a "new" NPA, and the PDP has not begun, the translator may reject the transaction or query as premature. Assuming the transaction or query was not rejected, and if no matching NPA/NNX pair is found with an unexpired PDP, a branch is taken to step 820, in which the signaling network interface software forwards the message to the addressed SPA without translation.

If, however, the NPA/NXX pair is one affected by an NPA split for which a PDP is unexpired, then the method continues in step 818. The translator translates (or replaces) the old NPA/NXX in the message with the new NPA/NXX as directed by the translation table entry. In step 820, the signaling network interface software forwards the translated message to the addressed SPA.

In step 822, the addressed SPA performs the requested transaction using the current value of the message. Advantageously, if the message contained a reference to an old NPA/NXX pair, and that pair was involved in an NPA-split for which the permissive dialing period was unexpired, the reference will have been translated to the new NPA/NXX pair. Accordingly, the requested services will perform any search or other matching operation using the new NPA/NXX pair. Since instances in the database of the old NPA/NXX pair will already have been converted to the new NPA/NXX pair, the search or match will be successful, thus providing the permissive dialing feature. In step 824, the SPA delivers the results of the query or transaction to the requester.

Thus, an NPA split management system and methods for use in conjunction therewith have been disclosed which provide significant advantages over existing methods of updating Intelligent Network elements in the context of an NPA split. A Service Management System receives from a user descriptive instructions regarding an upcoming NPA split. The SMS responsively automatically identifies and updates affected databases, records, and services, both in SMS-managed components of the Intelligent Network, and in the SMS itself, to reflect corresponding changes in the NPA codes assigned to lines, subscribers, services, or the like. Instructions to perform the updates are transmitted from the SMS to the affected Intelligent Network elements. In addition, the system provides a translation in the affected Intelligent Network elements to ensure calls to telephone numbers involved in the NPA split (or other Intelligent Network transactions involving those numbers) are processed correctly before, during, and after a user-defined permissive dialing period. This advantageously greatly simplifies the task for telecommunications service providers of reliably and consistently propagating the appropriate changes to databases, records and services, to all affected Intelligent Network elements. The system eliminates significant manual operations, obviates wholesale replication of databases or records, and simplifies the task of providing permissive dialing.

It will be appreciated by one of skill in the art that the above-described exemplary embodiment of the invention may be modified in various ways without departing from the spirit of the invention. For example, although the embodiment is described in the context of changes to the NPA code and central office code components of telephone directory numbers as defined in the North American Numbering Plan, it will be understood that the invention may also be applied to manage other types of changes in number address assignments, including, but not limited to those affecting country codes, city codes, central office codes, or any combination or subset thereof. Moreover, although the embodiment is described in the context of the Intelligent Network, as implemented in a particular telephone network infrastructure, it will be understood that the invention could also be employed to advantage in other networks having different topologies and assigning different functional responsibilities to various components, in which networks similar problems may be experienced as a result of large-scale changes to destination addresses.

The above-described embodiment of the invention is merely one example of a way in which the invention may be carried out. Other ways may also be possible and are within the scope of the following claims defining the invention.

What is claimed is:

1. A system for managing a numbering plan area (NPA) split in a telecommunications network Intelligent Network environment having at least one Intelligent Network element containing a plurality of information items relating to a telecommunications service including a representation of said at least one telephone directory number, and the NPA split requiring a change in a defined portion of at least one telephone directory number of said telecommunications network, said system comprising:

a service management system operatively coupled to said at least one Intelligent Network element;

said service management system having a user interface for receiving information about said NPA split, said information including a representation of a pre-split value of said defined portion and a post-split value of said defined portion;

said service management system further having indicia identifying information items of said Intelligent Network element which must be changed as a result of said NPA split;

said service management system further having an instruction generator responsive to said indicia and said information about said NPA split for providing an instruction to said intelligent network element to convert representations of said pre-split value of said defined portion of said at least one telephone directory number to representations of said post-split value within said information items; and said at least one Intelligent Network element further having a converter operative in response to said instruction to convert representations of said pre-split value of said defined portion of said at least one telephone directory number to representations of said post-split value within said information items.

2. The apparatus of claim 1 wherein said defined portion includes an NPA code.

3. The apparatus of claim 1 wherein said defined portion includes an NPA code and a central office code.

4. The apparatus of claim 1 wherein:

said plurality of information items comprises a first subset of information items of a type requiring change as a result of said NPA split and a second subset of information items of a type not requiring change as a result of said NPA split; and said indicia of said service management system identifies said first subset.

5. The apparatus of claim 1 wherein:

said generator is responsive to said indicia for generating an instruction to said plurality of information items includes some information items containing a representation of a telephone directory number;

and said generator is responsive to said indicia for generating an instruction to said at least one Intelligent Network element to convert such information items containing a representation of a telephone directory number.

6. The apparatus of claim 1 wherein:

said plurality of information items includes some information items containing a representation of a telephone billing number; and said generator is responsive to said indicia for generating an instruction to said at least one Intelligent Network element to convert such information items containing a representation of a telephone billing number.

7. The apparatus of claim 1 wherein:

said plurality of information items includes some information items containing a representation of a telephone routing address; and said generator is responsive to said indicia for generating an instruction to said at least one Intelligent Network element to convert such information items containing a representation of a telephone routing address.

8. The apparatus of claim 1 wherein:

said plurality of information items includes some information items containing a representation of an NPA code; and said generator is responsive to said indicia for generating an instruction to said at least one Intelligent Network element to convert such information items containing a representation of a NPA code.

9. The apparatus of claim 1 wherein:

said plurality of information items includes some information items containing a representation of a central office code; and said generator is responsive to said indicia for generating an instruction to said at least one Intelligent Network element to convert such information items containing a representation of a central office code.

10. The apparatus of claim 1 wherein:

said plurality of information items comprises a plurality of records, each having a plurality of data fields, at least one of said data fields containing a representation of a telephone directory number; and said generator is responsive to said indicia for generating an instruction to said at least one Intelligent Network element to convert such data fields containing a representation of a telephone directory number.

11. The apparatus of claim 1 wherein:

said plurality of information items comprises a database having defined therein a plurality of attributes, at least one of said attributes containing a representation of a telephone directory number; and said generator is responsive to said indicia for generating an instruction to said at least one Intelligent Network element to convert attributes containing a representation of a telephone directory number.

12. The apparatus of claim 1 wherein:

said Intelligent Network element further comprises a receiver adapted to receive service requests from said telecommunications network; and a translator for translating representations of said pre-split value of said defined portion of said at least one telephone directory number contained in said service requests to representations of said post-split value.

13. The apparatus of claim 1 wherein:

said Service Management System further comprises a translation table entry generator responsive to said information about said NPA split for enabling said intelligent network element to translate representations of said pre-split value of said defined portion of said at least one telephone directory number to representations of said post-split value.

14. The apparatus of claim 1 wherein:

said Intelligent Network element is responsive to a translation table entry provided by said Service Management System for translating representations of said pre-split value of said defined portion of said at least one telephone directory number contained in said service requests to representations of said post-split value.

15. A method operable in conjunction with a numbering plan area (NPA) split for updating information items in elements of the Intelligent Network and in a Service Management System, comprising the steps of:

(a) said service management system receiving information defining an NPA split in which at least a defined portion of a telephone number must change as a result of said NPA split from a pre-split value to a post-split value;

(b) said service management system determining which information items of said Intelligent Network elements are of a type which must change as a result of said NPA split; and (c) said service management system generating an instruction to said Intelligent Network elements to convert in said determined information items representations of said pre-split value into representations of said post-split value.

16. The method of claim 15 further comprising the step of:

(d) responsive to said instruction from said Service Management System, said Intelligent Network elements converting in said determined information items representations of said pre-split value into representations of said post-split value.

17. The method of claim 16 further comprising the step of:

(e) said Intelligent Network elements reporting to said Service Management System completion of said converting step.

18. The method of claim 17 further comprising the step of:

(f) said Service Management System performing a conversion on a local copy of the information items of said Intelligent Network elements, said conversion being equivalent to that performed by said Intelligent Network Element.

19. The method of claim 15 further comprising the steps of:

(d) said service management system generating a translation table entry identifying said pre-split value and said post split value of said defined portion of a telephone number; and (e) said service management system transmitting said translation table entry to said Intelligent Network Element.

20. The method of claim 19 further comprising the steps of:

(f) said Intelligent Network element receiving said translation table entry;

(g) said Intelligent Network element receiving a request for service containing a telephone directory number affected by said NPA split; and (h) said Intelligent Network element translating said defined portion of said telephone directory number of said request for service from said pre-split value to said post-split value.

21. The method of claim 20 further comprising the step of:
(i) providing a service responsive to said translated value of said defined portion of said telephone directory number of said request for service.

22. A system for managing a numbering plan area (NPA) split in a telecommunications network Intelligent Network environment having at least one Intelligent Network element containing a plurality of information items relating to a telecommunications service including a representation of said at least one telephone directory number, and the NPA split requiring a change in a defined portion of at least one telephone directory number of said telecommunications network, said system comprising:

a service management system operatively coupled to said at least one Intelligent Network element;

said service management system having a user interface for receiving information about said NPA split, said information including a representation of a pre-split value of said defined portion and a post-split value of said defined portion;

said service management system further having indicia identifying information items of said Intelligent Network element which must be changed as a result of said NPA split;

said service management system further having an instruction generator responsive to said indicia and said information about said NPA split for providing an instruction to said intelligent network element to convert representations of said pre-split value of said defined portion of said at least one telephone directory number to representations of said post-split value within said information items;

said at least one Intelligent Network element further having a converter operative in response to said instruction to convert representations of said pre-split value of said defined portion of said at least one telephone directory number to representations of said post-split value within said information items;

said at least one Intelligent Network element being adapted to maintain for each of said information items subject to conversion the converted version of such information item without maintaining an unconverted version of such information unit once conversion is complete.

23. A method operable in conjunction with a numbering plan area (NPA) split for updating information items in elements of the Intelligent Network and in a Service Management System, comprising the steps of:

(a) said service management system receiving information defining an NPA split in which at least a defined portion of a telephone number must change as a result of said NPA split from a pre-split value to a post-split value;

(b) said service management system determining which information items of said Intelligent Network elements are of a type which must change as a result of said NPA split;

(c) said service management system generating an instruction to said Intelligent Network elements to convert in said determined information items representations of said pre-split value into representations of said post-split value; and (d) responsive to said instruction from said Service Management System, said Intelligent Network elements converting in said determined information items representations of said pre-split value into representations of said post-split value, and maintaining for each of said information items subject to conversion the converted version of such information item without maintaining an unconverted version of such information unit once conversion is complete.

* * * * *